United States Patent [19]

Carton

[11] 3,935,620

[45] Feb. 3, 1976

[54] CLAMP BAND RETENTION APPARATUS FOR A PARKING BRAKE CHAMBER

[75] Inventor: Michael L. Carton, Chesterfield, Mo.

[73] Assignee: Wagner Electric Corporation, Parsippany, N.J.

[22] Filed: Apr. 3, 1975

[21] Appl. No.: 564,889

[52] U.S. Cl. .................. 24/279; 92/63; 303/9
[51] Int. Cl.². F01B 7/00; B60T 13/00; B65D 63/06
[58] Field of Search.... 285/117, 252, 253, 365–367, 285/405–411; 24/282, 280, 281, 284, 279; 188/170; 92/62–64; 303/6 M, 9

[56] References Cited
UNITED STATES PATENTS

| 875,844 | 1/1908 | Peacock | 285/253 X |
| 2,283,179 | 5/1942 | Buckingham | 24/279 |
| 2,788,498 | 4/1957 | Hardaway | 285/407 X |
| 2,976,085 | 3/1961 | Grogan | 188/170 X |
| 3,104,901 | 9/1963 | Potter | 285/406 X |
| 3,285,672 | 11/1966 | Avrea | 303/9 |
| 3,811,365 | 5/1974 | Gordon et al. | 92/63 |

Primary Examiner—Donald A. Griffin

[57] ABSTRACT

There is disclosed apparatus for preventing explosive separation of a heavy spring loaded first portion of a parking brake chamber from a second portion thereof. A clamping band, typically secured by a fastener assembly, is provided at the interface between the two portions of the chamber to maintain them in operative engagement. The apparatus disclosed insures continued engagement upon accidental or inadvertent release of the clamping band under spring loading.

9 Claims, 11 Drawing Figures

CLAMP BAND RETENTION APPARATUS FOR A PARKING BRAKE CHAMBER

The present invention relates to apparatus for enhancing safe operation and maintenance of heavy spring loaded parking brake chambers and more specifically, to clamp band retention devices adapted to prevent explosive separation of portions of such chambers while under spring loading. Housing primary and secondary or auxiliary brake actuation apparatus within a single chamber is well known. Complementary or alternative operation of the primary and auxiliary apparatus has been provided in various braking systems. In a characteristic system there has been provided auxiliary spring powered actuation for brakes of the fluid operated type, the fluid operation or actuation defining a primary mode of operation for the braking system.

Characteristically, there has been provided an auxiliary spring powered actuator unit associated directly with a respective pneumatic actuator for an individual wheel brake. A typical system depends for its source of primary actuation on air pressure introduced by means of a service line. Known systems have typically relied on the complementary association referred to hereinabove in a manner somewhat analogous to and readily appreciated by a binary association as applied to pneumatic systems generally. Thus, given an air pressure source, it is desired that failure of pneumatic primary brake actuation, which might be viewed conveniently as a change from a logical 1 condition to a logical 0 condition, occasions initiation of actuation of the auxiliary system, which might be viewed conveniently as a change from a logical 0 condition to a logical 1 condition. From this analysis, it is seen that the auxiliary system must be inhibited by application of air pressure and enabled by failure of such. This has been achieved by applying air pressure within an auxiliary chamber to maintain a spring actuated piston in its fully seated or retracted position. Spring actuated brake application can be initiated in the event of failure of the primary source of air pressure.

Units having the general structural and functional characteristics described have been devised in the form of spring set safety brake chambers providing customary service air brake operation and, in addition, spring set parking-emergency brake operation. Such units have the desirable attributes of high reliability and enhanced performance characteristics. The unit typically contains a spring set air released chamber segment which is superimposed upon a conventional air brake chamber in place of the more traditional pressure plate. An additional air line may be provided to supply compressed air to the air released chamber from a separate parking brake actuating system.

In such units the service air brake chamber converts the pressure of compressed air into mechanical force and motion. Air pressure, entering, forces the chamber diaphragm to flex and carry the push rod outward. When the pressure is released, the rod and diaphragm resume their static position due to the action of the unit return spring and other springs in the actuated system.

The spring set air released chamber is held released during normal service brake operations, its heavy parking spring cocked into an energy storing compression by parking brake air pressure exerted upon the chamber diaphragm. When this disabling air pressure is voided for any reason, the thrust of the cocked spring against push rods applies the brake.

Units of the type described may require periodic maintenance or adjustment. During the course of such operations and especially at the initiation of same, extreme care must be exercised to insure that the various portions of the device are separated in an operative status wherein there is no spring loading.

Various methods exist for insuring positive retention of the various portions of the unit described hereinabove, until such time as it may be found desirable to separate them as, for example, to accomplish maintenance or adjustment. Among such methods, clamp band retention has been found convenient and desirable, providing certain advantages, not the least of which may be characterized as economic. Clamp band retention has been found to provide an inexpensive alternative to more elaborate structural design of the various housing portions of the cooperating elements of the brake chamber.

Given the advantages of clamp band retention which are manifold, it becomes a matter of insuring that the bands themselves are retained for so long as it should be necessary to insure the safety of operating and service personnel.

Various methods of either clamp band retention, rear housing retention, and limited spring extension have been investigated in view of the possible inadvertent opening of the rear section of the parking chamber.

The retention of the clamp band can be accomplished by either prevention of the separation of the two clamps unless the load separating the two housings is removed or by hardware oriented techniques.

The retention can be accomplished in several ways that depend on spring load to provide excessive friction loadings and detent catches.

The hardware oriented techniques can be several. First, the threaded fastener (bolt) can use double nuts to make unusually difficult to undo the clamps. Second, the clamping bolt could be deformed in various manners behind the nut preventing removal of the nut beyond a certain point that would allow the separation of the housings. The deformed section of the bolt could be cut off at the time of rebuilding. Third, the nut and bolt may be physically welded which will require cutting the bolt to dismantle the chamber.

As to housing retention, the design complexities of this technique generally causes this to be prohibitively expensive due to the interconnection means which may not be compatible with a diaphragm type construction. In a diaphragm construction the retention means cannot be in constant contact with its mating part due to the variations in the clamp height of the characteristic bead clamping the diaphragm. This results in a retention means which may not come into contact with its mating means until after the clamp band is completely free of the housings and the housings are accelerating away from each other under the power spring force. When the retention means comes into contact, high impact loading occurs which exceeds by far the output force of the power spring. Often there is failure of retention means due to the impact loadings imparted when the clamp bands were removed.

The limitation of spring extension is only a partial answer to this situation as it only limits, not eliminates, the extent of energy expended upon the removal of the clamp bands. Two types of restraints are available. These are a flexible restraint such as cable restraints and mechanical restraints such as pinned rods, sleeves and bolts. Packaging of flexible restraints in such a manner as to not interfere with the power spring and keep clear of caging devices is often difficult. The mechanical devices either must have collapsible qualities to reduce the overall height of the chamber assembly such as collapsible threaded tubes or sacrifice the overall length dimension of the unit, in excess of its stroke. The former is costly economically, and the later is costly in close quarter installations.

Accordingly, it is an object of the present invention to provide retention apparatus which simultaneously insures continued interconnection of cooperatively associated housing portions of a braking chamber, one of which is heavy spring loaded, when an associated clamp band is inadvertently released under spring load, minimizes design complexity and attendant expense while maximizing reliability and thus greatly enhancing safe employment and maintenance of such braking chambers.

With this object in view, there is provided apparatus for preventing accidental explosive separation of a heavy spring loaded first section of a parking brake chamber comprising a clamp band circumferentially extending about the interface between the first portion of the chamber and another of the portions, the clamp band being adapted to receive a fastener assembly therewith associated, the clamp band being thereby adapted to maintain in operative association the two portions of the chamber, means structurally and operatively associated with the clamp band for restraining the clamp band in its functionally effective operative position upon inadvertent release of the fastener assembly under spring loading, the means comprising first and second cooperating portions, the first portion of the means being outermost in radial extent as measured from a longitudinal axis common to the chamber portions and the second portion being innermost as measured with respect thereto, the first portion of the means being adapted to arrest outward circumferential expansion of the clamp band through cooperative association with the second portion of the means being defined as the structure which lends itself to alternative engagement of the first portion of the means with the clamp band or with a portion of either of the chamber portions to maintain engagement of the chamber portions at the interface until removal of the spring loading and manual manipulation to achieve displacement of one of the portions of the means with respect to the other portion of the means.

In accordance with one aspect of the present invention, there is provided restraining or retaining means the first portion of which is in the form of at least one lug formed integrally with the spring loaded chamber portion and the second portion of which is in the form of at least one notch in the clamp band.

Desirably, the cooperative association of the first and second portions of the restraining or restraining means is defined as positioning on the spring loaded portion of the parking brake chamber of each restraining lug and positioning on the clamp band of each notch such that an assembled brake chamber, having the clamp band secured in place has each lug extending over a portion of the clamp band, angularly displaced from each notch.

In accordance with another aspect of the present invention, there is provided restraining or retaining means the first portion of which is an arresting member formed on the clamp band and having, in cross section, a generally downward extending projection and the second portion is formed on a flange associated with a housing containing the elements of one portion of the brake chamber, the second portion having, in cross section, a generally upward extending projection.

Desirably, in accordance with the latter aspect of the present invention, both portions of the restraining or retaining means are circumferentially extending for substantially the circumferential extent of their respective associated components.

These and other aspects of the present invention may be more readily understood with reference to the accompanying drawings, presented by way of example only, and in which.

Figure 1:
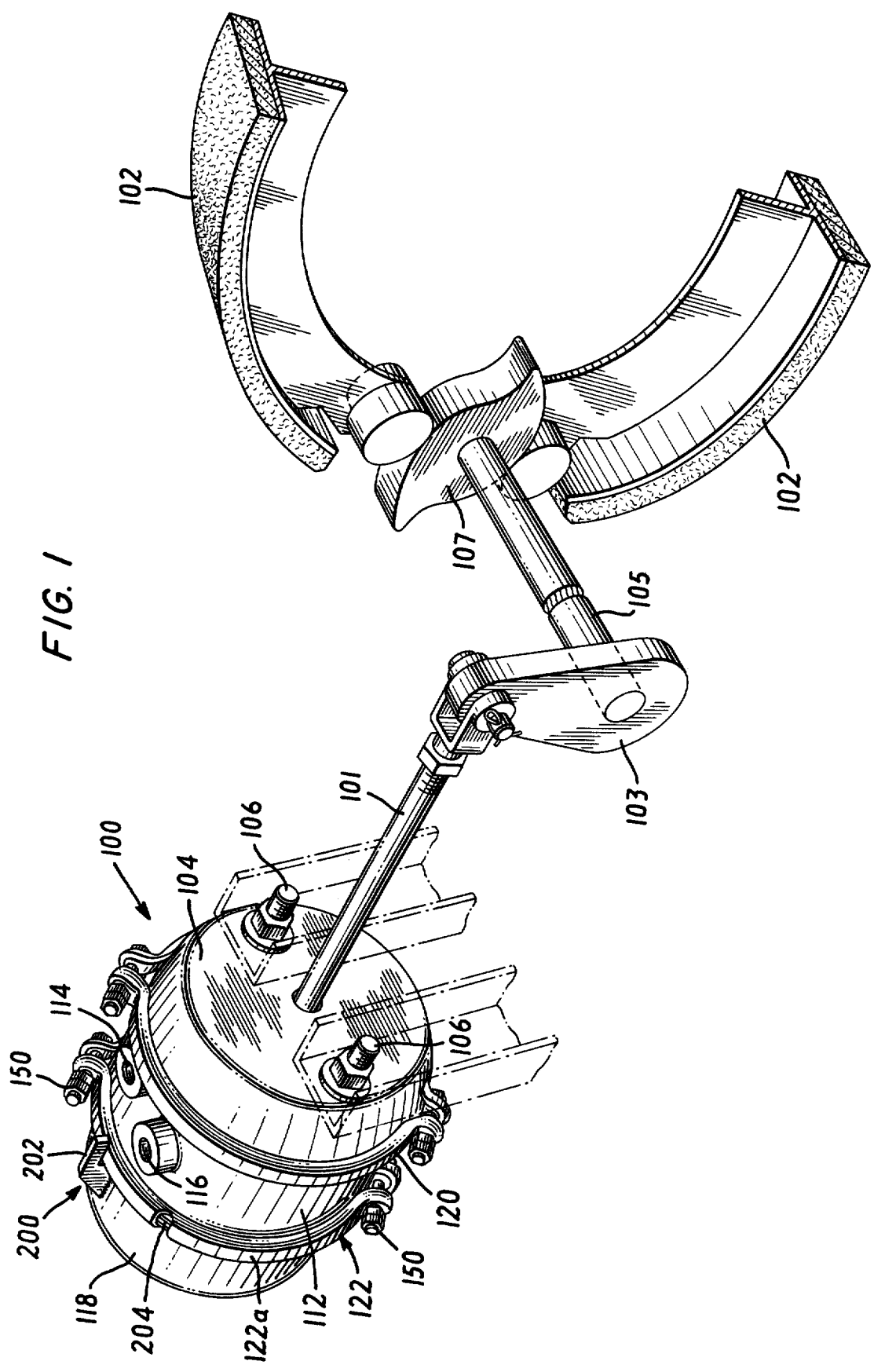
FIG. 1 shows in elevation a parking brake chamber having clamping bands securing the portions thereof the assembly being shown in perspective in association with a braking mechanism.

Referring now to FIG. 1, there is shown a spring set safety brake the chamber of which is designated generally by the reference numeral 100. The chamber 100 is constituted by three housing portions, the first of which is a non-pressure plate 104 including mounting means 106 to which brackets may be affixed for securing the chamber to an axle (not shown). A second housing portion, or middle housing 112, is provided with ports 114 and 116 through which air is introduced into the chamber to provide actuation and control of the various cooperatively associated elements of the chamber in a manner to be described hereinafter in connection with a discussion of FIG. 2. Within the context of such discussion will appear a concomitant explanation of the functioning of the various elements housed within a third housing portion 118 forming the outer or rear portion of the chamber 100. In assembly, the non-pressure plate 104 is clamped to middle housing 112 by a clamp band 120. A second clamp band 122 including outermost radial face 122a secures middle housing 112 to rear housing 118.

Figure 2:
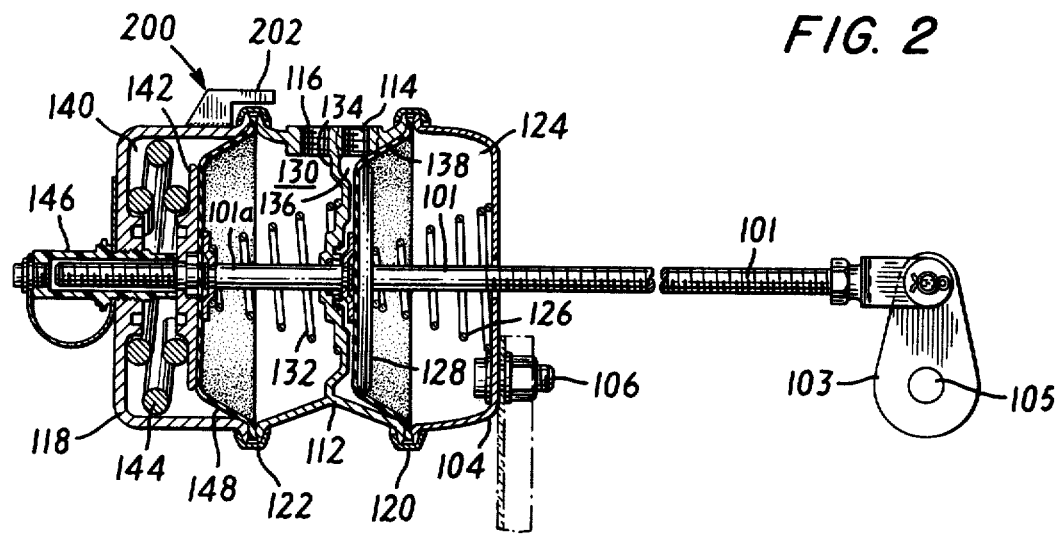
FIG. 2 shows in cross section the various components of the chamber of FIG. 1, a brake actuating push rod inserted therein and extending therethrough, and the restraining or retention apparatus of the present invention; and, FIG. 3 shows an alternative embodiment of the restraining or retention apparatus of the present invention.

Referring now to FIG. 2, and with continued reference to FIG. 1 and commencing the discussion of the structural juxtaposition, interconnection and expressed or implied functional interrelationship of elements within the chamber 100 through utilization of sequential designation of reference numerals, a push rod 101 provides that means by which mechanical force is delivered to provide actuation of the brakes, or, equivalently, extention of brake shoes 102. Structurally interconnecting slack adjuster 103, shaft 105 and cam 107 provides such intermediate functional association as may be required to convert the implied linear displacement into the stated radial displacement in a manner which will be readily understood in connection with the drawings.

Interior of the chamber 100, and more specifically, the first portion 104, is a first chamber 124 within which is housed a relatively light load spring 126 and a plate 128. A second chamber 130 within housing portion 112 is provided with a similar light load spring 132. A plate 134 is housed therein and integrally formed therewith. The function of the plates 128 and 134 will be described hereinafter. The chamber 100 is further partitioned into chambers 136 and 140 for reasons that will be dicussed hereinafter.

Received within chamber 124 is the externally operable push rod 101 fixedly attached to plate 128, entering through plate 104 via an opening permitting of communication with the atmosphere. Thus, fluid communication of the chamber 124 with the atmosphere is established.

An extension 101a of push rod 101 is received within the chamber 130. Extension 101a is such in the sense that it is coaxial with push rod 101 and separable therefrom. Viewing push rod 101 and its extension 101a is substantially continuous it is noted that such entity passes from chamber 124 through an opening in plate 134.

Diaphragm 138 is located intermediate the plate 128 and the chamber 136. Chamber 136 is thereby sealingly separated from chamber 124.

A fourth chamber 140 is formed within rear housing portion 118 of safety brake chamber 100. Contained within the chamber is a plate 142, relatively high load spring 144, and may contain a disabling fitting 146 for the assembly as a whole and more specifically for disabling relatively high load spring 144 if desired. The chamber 140 is sealingly separated from the chamber 130 by a second diaphragm 148.

Prior to operation of the apparatus hereinabove described spring 126 normally urges rod 101 and plate 128 to the left as indicated in FIG. 2 while spring 132 normally urges rod 101a to the left. Spring 144 is compressed within chamber 140 between plate 142 and rear housing 118.

In applying the service brake hereinabove described, fluid pressure enters chamber 136 via port 114 to urge diaphragm 138, plate 128 and rod 101 to the right as will be appreciated from the arrangement shown in FIG. 2 and the preceding discussion. Thus, brake actuation for normal service is accomplished.

Upon release of the service brakes, rod 101 returns to the left. Constant fluid pressure is communicated to chamber 130 via port 116 to maintain rod 101a, diaphragm 148 and plate 142 to the left. Upon actuation of the emergency brake constant pressure is relieved via port 116 permitting rod 101a to move to the right thus also moving rod 101 to the right for actuating the brakes for emergency or parking use.

It will be appreciated that while spring 144 is under compression within chamber 140, removal of clamp, as by loosening bolts 150 (shown in FIG. 1) to permit circumferential expansion of band 122, would precipitate immediate explosive separation of rear housing 118 from middle housing 112. Thus, it is required that the spring be caged as by operation of a disabling fitting Such as 146. Upon accomplishment of this manual operation, clamp band may be safely removed. However, when service personnel attempt to remove the clamp band 122 without caging the spring 144, serious injury could result as will be readily appreciated.

With particular reference to a suitable restraining device provided in accordance with an aspect of the present invention, shown in FIGS. 1 and 2 is a lug 200 may be formed integrally with rear housing 118 such as by casting, it will be observed that outward radial expansion would normally be restrained to thereby insure safe maintenance and repair. It will be noted that an elongated or horizontally extending portion or leg 202 of the lug 200 extends over clamp band 122.

Notches 204 are formed in radial face 122a and are additionally provided in accordance with this aspect or embodiment of the instant invention. Thus, upon caging of the spring 144, clamp band 122 may be rotated until a respective notch 204 is in alignment with its associated lug 200 at the leg portin 202 thereof. Thus, the restraining or retaining means may be made inoperative to allow release of the clamp band 122.

Consonant with that which has been illustrated in the drawing figures in connection with a presentation of a preferred embodiment of the instant aspect of the invention there has been discussed the cooperative association of a plurality of lugs 200 and associated notches 204. It will be apparent to one of ordinary skill in the art that the number of associated pairs of lugs 200 and notches 204 may be as small as one.

Figure 3:
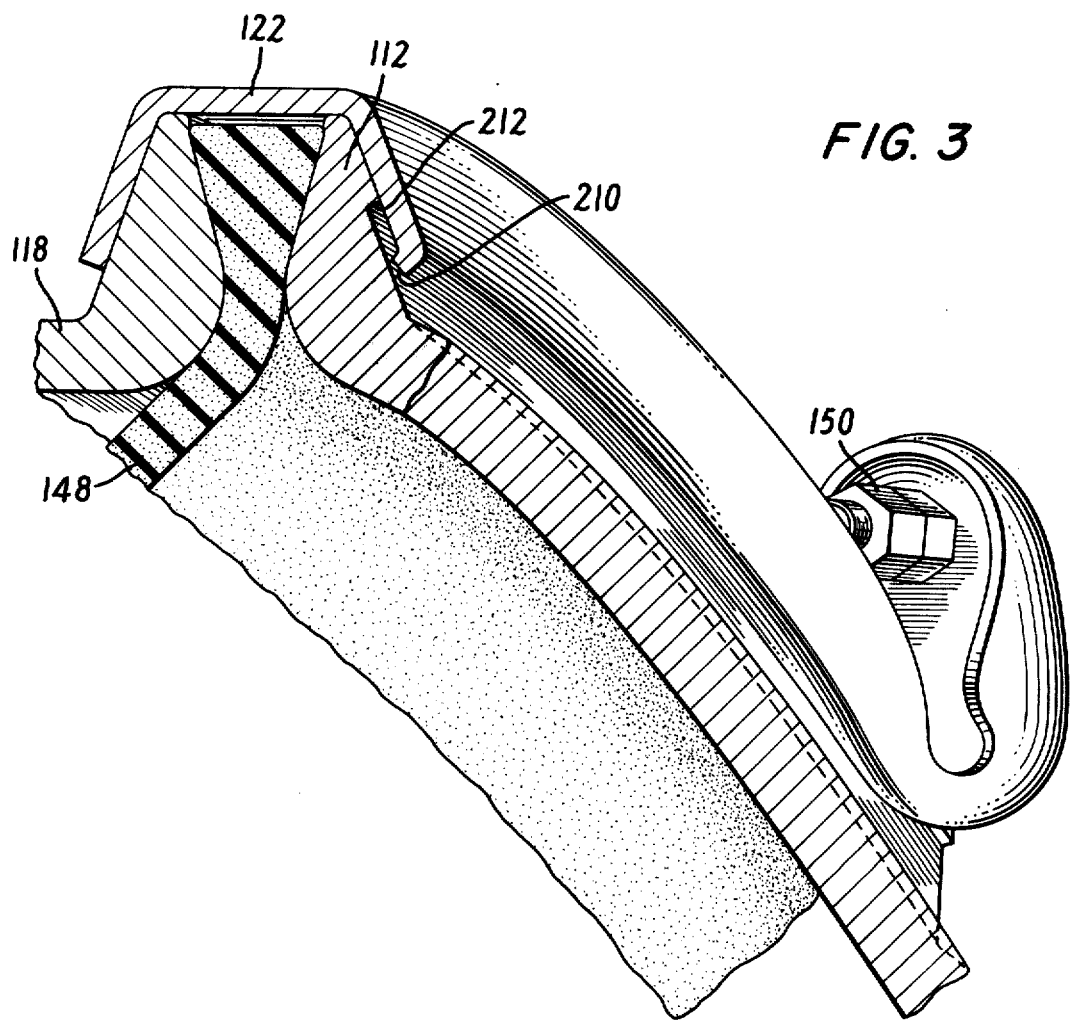

Shown in FIG. 3, in accordance with another aspect of the present invention is an alternative embodiment of the restraining or retaining means. In accordance with this aspect, there are provided means for effectively and reliably limiting radial expansion. Shown in FIG. 3 is a first portion of the restraining means 210 which may be conveniently denominated a circumferentially extending lip. Lip portion 210 is formed on clamp band 122 for engagement with a second portion of the restraining means which may be conveniently denominated a circumferentially extending step 212 formed on a flange portion of either of the housing portions 112 or 118. Upon inadvertent loosening of the clamp band 122 under spring loading, the cooperative engagement of lip portion 210 and step portion 212 arrests further radial expansion of the clamp band 122 and thus explosive separation of the rear housing portion 118 from intermediate or central housing portion 112 of the brake chamber 100.

It will be understood that the claims are intended to cover all changes and modifications of the preferred embodiments of the invention, herein chosen for the purpose of illustration, which do not constitute departures from the spirit and scope of the invention.

What is claimed is:

1. Apparatus for preventing accidental explosive separation of a first heavy spring loaded section of a spring set safety brake chamber from a second adjacent section of the chamber comprising:
   a. a clamp band circumferentially extending about an interface between the adjacent sections, the band radially outwardly extendable from the interface; and
   b. means fixedly attached to the brake chamber adjacent the interface for restrictively engaging the clamp band to limit radial outward extension of the band.

2. The apparatus of claim 1, wherein:
   the clamp band is rotatably mounted on the chamber and includes a radially outermost face and at least one notch formed therein; and
   the means attached to the brake chamber comprises an elongated lug means positioned for alignment with the notch upon rotation of the band.

3. The apparatus of claim 1, wherein:
   the clamp band includes a circumferentially extending radially inwardly protruding lip portion; and
   the means attached to the brake chamber comprises a circumferentially extending radially outwardly protruding step portion corresponding to the lip portion for engagement therewith.

4. Apparatus for preventing accidental explosive separation of a first heavy spring loaded section of a spring set safety brake chamber from a second adjacent section of the chamber comprising:
- a. a clamp band circumferentially extending about an interface between the adjacent sections, the band radially outwardly extendable from the interface; and
- b. means fixedly attached to at least one of the sections adjacent the interface for limiting radial outward extension of the band.

5. The apparatus of claim 4, wherein:

the clamp band is rotatably mounted on the chamber and includes a radially outermost face and at least one notch formed therein; and the means attached to the brake chamber comprises an elongated lug means positioned for alignment with the notch upon rotation of the band.

6. The apparatus of claim 4, wherein:

the clamp band includes a circumferentially extending radially inwardly protruding lip portion; and the means attached to the brake chamber comprises a circumferentially extending radially outwardly protruding step portion corresponding to the lip portion for engagement therewith.

7. Apparatus for preventing accidental explosive separation of a first heavy spring loaded section of a spring set safety brake chamber from a second adjacent section of the chamber comprising:
- a. a clamp band circumferentially extending about an interface between the adjacent sections and in abutting relationship with the interface, the band radially outwardly extendable from the interface;
- b. means fixedly attached to the brake chamber adjacent the interface for restrictively engaging the clamp band to limit radial outward extension of the band; and
- c. means on the clamp band spaced radially inwardly of the means attached to the brake chamber for restrictive engagement therewith upon radial outward extension of the band.

8. The apparatus of claim 7, wherein:

the clamp band is rotatably mounted on the chamber;

the means on the clamp band includes a radially outermost face formed on the clamp band and at least one notch is formed therein; and the means attached to the brake chamber comprises an elongated lug means positioned for restrictively engaging the radially outermost face of the band upon radial outward extension thereof and for alignment with the notch upon rotation of the band.

9. The apparatus of claim 7, wherein:

the means on the clamp includes a circumferentially extending radially inwardly protruding lip portion; and the means attached to the brake chamber comprises a circumferentially extending radially outwardly protruding step portion corresponding to the lip portion for engagement therewith.

* * * * *